US012751576B2

(12) United States Patent
Tian et al.

(10) Patent No.: US 12,751,576 B2
(45) Date of Patent: Oct. 6, 2026

(54) GRILL WITH EXTERNAL BURNER

(71) Applicant: NINGBO AGSUN PRODUCTS, INC., Cixi (CN)

(72) Inventors: Haiquan Tian, Cixi (CN); Caihua Sun, Cixi (CN); Zhiyong Le, Cixi (CN); Xianghua Liu, Cixi (CN); Xuefei Mao, Cixi (CN)

(73) Assignee: NINGBO AGSUN PRODUCTS, INC., Cixi (CN)

( * ) Notice: Subject to any disclaimer, the term of this patent is extended or adjusted under 35 U.S.C. 154(b) by 350 days.

(21) Appl. No.: 18/633,080

(22) Filed: Apr. 11, 2024

(65) Prior Publication Data

US 2024/0251991 A1 Aug. 1, 2024

(30) Foreign Application Priority Data

Mar. 6, 2024 (CN) ......................... 202420434790.3

(51) Int. Cl.
*A47J 37/07* (2006.01)

(52) U.S. Cl.
CPC ....... *A47J 37/0713* (2013.01); *A47J 37/0745* (2013.01)

(58) Field of Classification Search
CPC . A47J 37/0713; A47J 37/0704; A47J 37/0745
See application file for complete search history.

(56) References Cited

U.S. PATENT DOCUMENTS

| | | | | |
|---|---|---|---|---|
| 4,819,614 A * | 4/1989 | Hitch | A47J 37/0713 | 126/41 R |
| 2003/0213484 A1 * | 11/2003 | Alden | A47J 37/0713 | 126/41 R |
| 2019/0075968 A1 * | 3/2019 | Koehn | A47J 37/0713 | |
| 2023/0309743 A1 | 10/2023 | VanDyke et al. | | |
| 2023/0392791 A1 | 12/2023 | Measom et al. | | |
| 2024/0074612 A1 | 3/2024 | Fullmer et al. | | |

FOREIGN PATENT DOCUMENTS

| | | | |
|---|---|---|---|
| AU | 2010100251 A4 * | 4/2010 | A47J 37/0713 |

* cited by examiner

*Primary Examiner* — Kristen C Hayes

(57) ABSTRACT

A grill with an external burner, wherein a burner is arranged at a functional opening below an integrally formed grill body so that air at the functional opening is heated when the burner burns, and the heated air rises to achieve heating up of a grill cavity; in addition, the air below the functional opening enters the functional opening under the action of air pressure to provide sufficient oxygen for the corresponding burner to ensure more sufficient combustion to improve energy conversion efficiency.

10 Claims, 10 Drawing Sheets

A

GRILL WITH EXTERNAL BURNER

TECHNICAL FIELD

The present invention belongs to the field of grills, and specifically pertains to a grill with an external burner.

BACKGROUND

For the prior art grills, reference may be made to Chinese Patent No. CN202320645146.6 which discloses a grill with burners that are easily disassembled and assembled, where an air supply assembly continuously supplies air to each burner for combustion, so that each burner located in a grill body uniformly heats the air inside the grill body and grills food by the heated air. In order to improve the efficiency of heat energy utilization, a circumferential direction and a lower end of the grill body are closed, and an upper end is provided with an opening to reduce heat diffusion of the heated air in circumferential and downward directions and to grill the food above the grill body with the heated air more efficiently.

However, due to the closure in the circumferential and downward directions, the air in the grill body burns and heats up so that an oxygen content of the air in the grill body is low, resulting in insufficient combustion of the burners and low energy conversion efficiency. In addition, the built-in burner blocks and affects an operating space, resulting in cleaning inconvenience.

SUMMARY

In view of the deficiencies of the prior art, it is an object of the present invention to provide a grill with an external burner, wherein a burner is arranged at a functional opening below an integrally formed grill body so that air at the functional opening is heated when the burner burns, and the heated air rises to achieve heating up of a grill cavity; in addition, the air below the functional opening enters the functional opening under the action of air pressure to provide sufficient oxygen for the corresponding burner to ensure more sufficient combustion to improve energy conversion efficiency.

In order to achieve the above object, the present invention provides the following technical solutions: a grill with an external burner, comprises: a grill rack; a grill body, wherein the grill body is integrally formed, the grill body is arranged on the grill rack, a grill cavity having an opening upward is provided in the grill body, a functional opening and a flow guide surface provided adjacent to the functional opening and arched upward are provided on a bottom of the grill cavity; and a burner provided at the functional opening; wherein a flame guide portion is provided on an inner peripheral wall of the functional opening, a combustion zone positionally corresponding to the flame guide portion is provided on the burner, the combustion zone and the flame guide portion are spaced apart, and the burner burns so that a flame emitted from the combustion zone is guided into the grill cavity through the flame guide portion to heat air in the grill cavity to radiate heat to an opening above the grill cavity.

By adopting the above-mentioned technical solutions, the present invention achieves the following beneficial effects:

1. Different burners are controlled by operating control knobs to start and stop combustion and regulate combustion size, the air at the corresponding functional opening is heated by the combustion of the burners, and the air is heated up to enter the grill cavity for heating the grill cavity, so that the heated grill cavity can grill food above the grill cavity, and the plurality of burners may heat up specific areas individually in case of individual heating and may heat up all spaces within the grill cavity more evenly in case of overall heating.
2. The heating up of the air at each functional opening will reduce air pressure at the corresponding position, so that the air below the corresponding functional opening will enter the functional opening under the action of air pressure and air flow to supplement oxygen at the corresponding burner, whereby ensuring sufficient oxygen supply to each burner and enabling complete combustion at each burner to improve the energy conversion efficiency; in addition, the burners are arranged at the functional openings, part of heat energy will be transferred downward to below the functional openings due to combustion, but most of the heat energy will enter the grill cavity under the effect of rising heat flow. That is, the heat energy increased by complete combustion is greater than the heat energy diffused from the functional openings.
3. The flow guide surface allows the air flow diffusing from the functional openings to be directed upwards, thereby preventing the air flow at each functional opening from flowing towards the adjacent functional openings and preventing the heat carried by the air flow from spreading to the outside of the grill body through the adjacent functional openings.
4. The flow guide surface and the functional openings also have the function of removing refuse, where the refuse comprises food residues, grease and the like, so that the falling refuse is guided towards the functional openings by the flow guide surface and is discharged from the grill cavity through the functional openings, and the refuse is discharged through the nearest functional opening, which greatly increases the smoothness of discharging the refuse.
5. The grill body is made of an enamel material, and has a better insulation effect compared to the grill body made of metal plates in order to reduce energy loss in the grill cavity caused by the heat diffusion of the grill body itself, thereby improving the efficiency of heat energy utilization. Moreover, the grill body is made of the enamel material and integrally formed, so that the grill body does not have any assembly gap, which eliminates the leakage of liquid refuse (especially grease) caused by the assembly gap, and can eliminate enamel burst of an assembled enamel assembly. In addition, the enamel grill body also has the characteristic of easy cleaning.
6. The burners are arranged on the bottom, which further facilitates cleaning of the inner peripheral wall of the grill body without interference from the burners.

Figure 1:
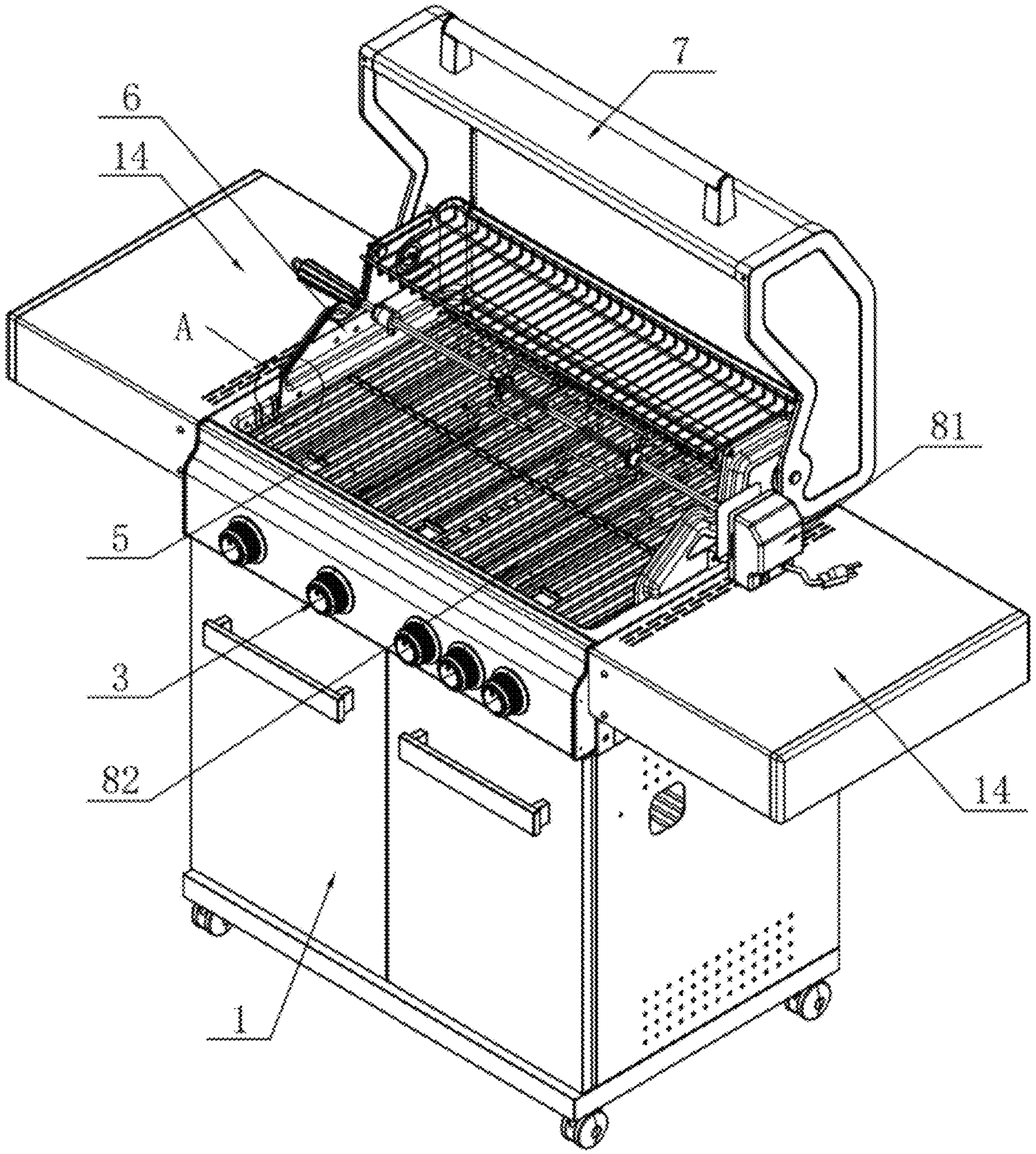
FIG. 1 is an assembly view of Embodiment I of the present invention.
Figure 2:
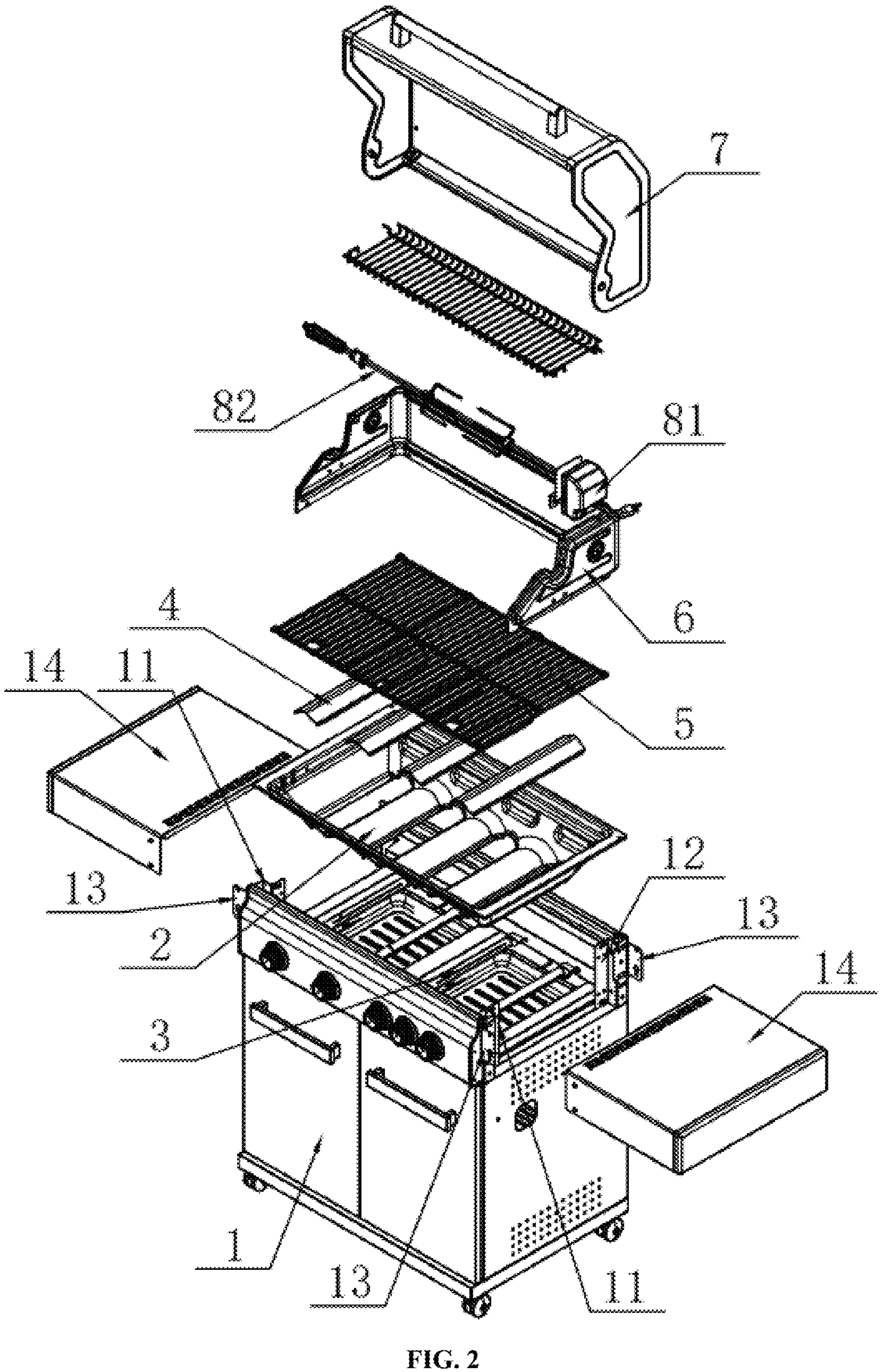
FIG. 2 is an exploded view of Embodiment I of the present invention.
Figure 3:
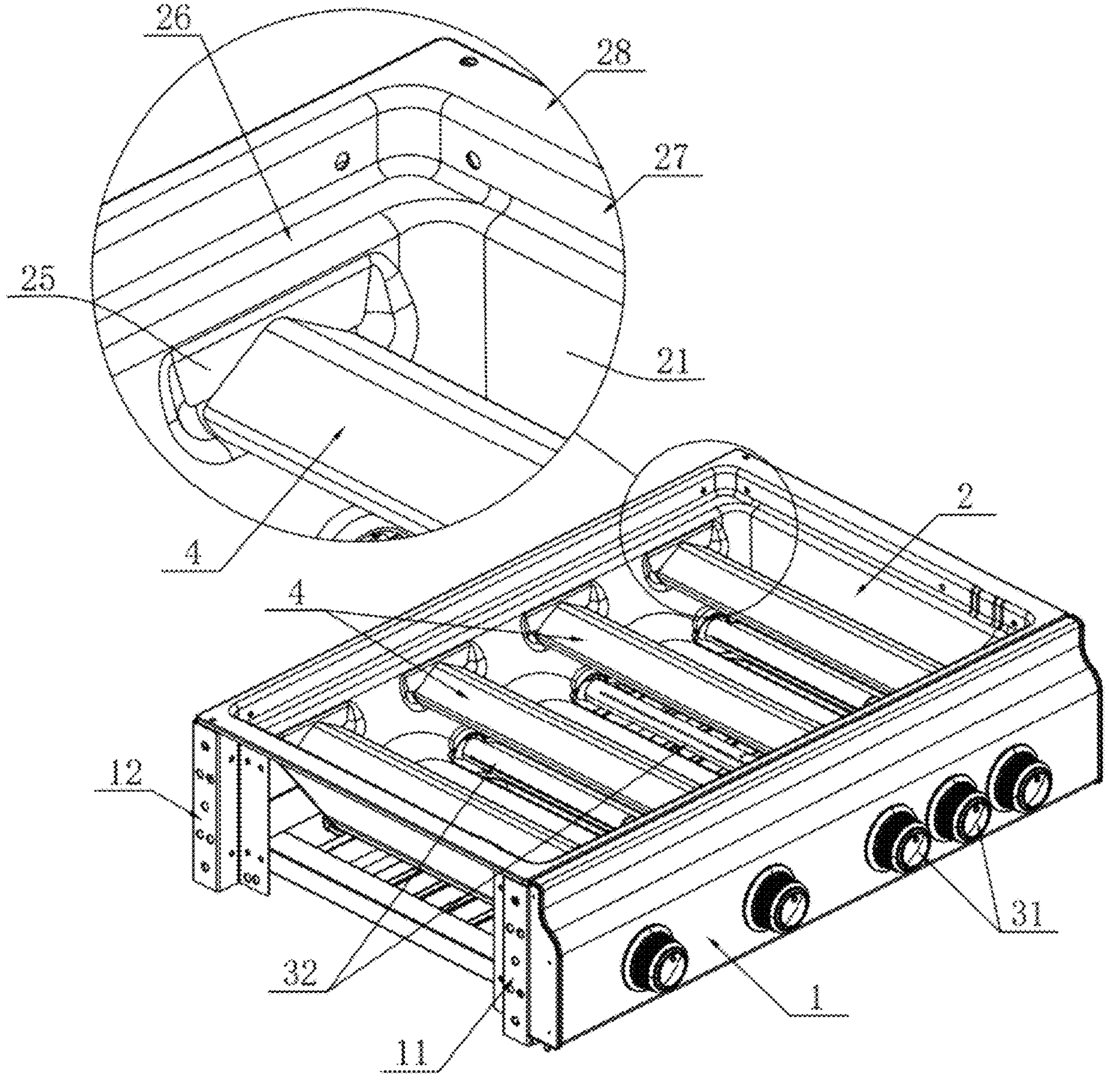
FIG. 3 is an assembly view of part of structures in Embodiment I of the present invention.
Figure 4:
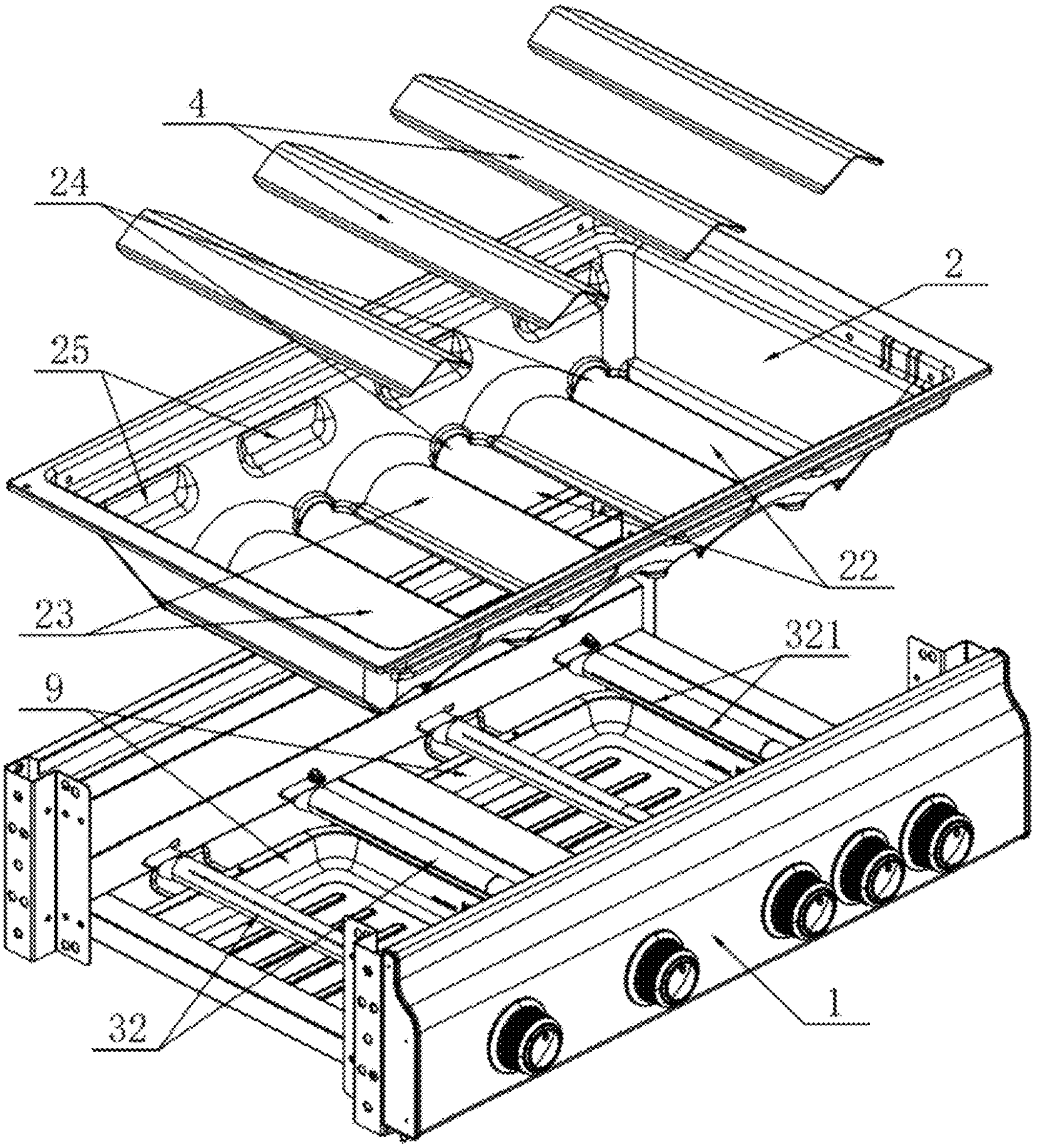
FIG. 4 is an exploded view of part of structures in Embodiment I of the present invention.
Figure 5:
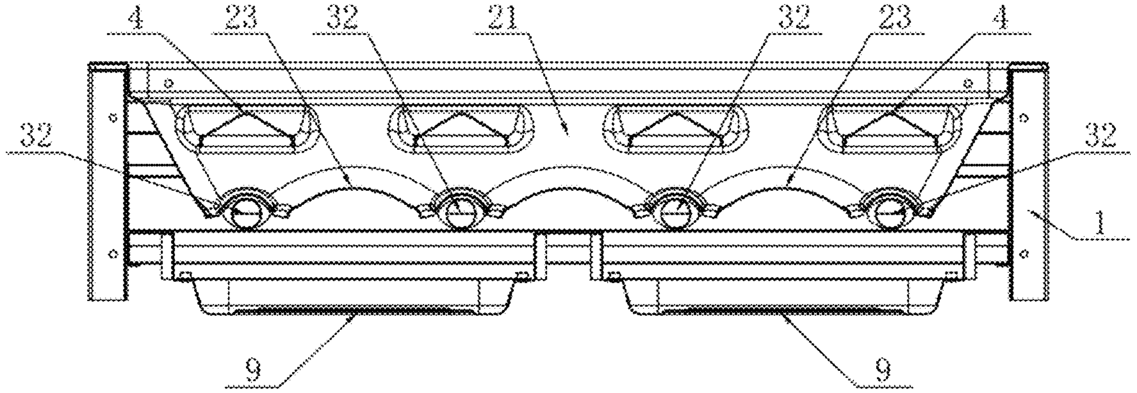
FIG. 5 is a section view of part of structures in Embodiment I of the present invention.
Figure 6:
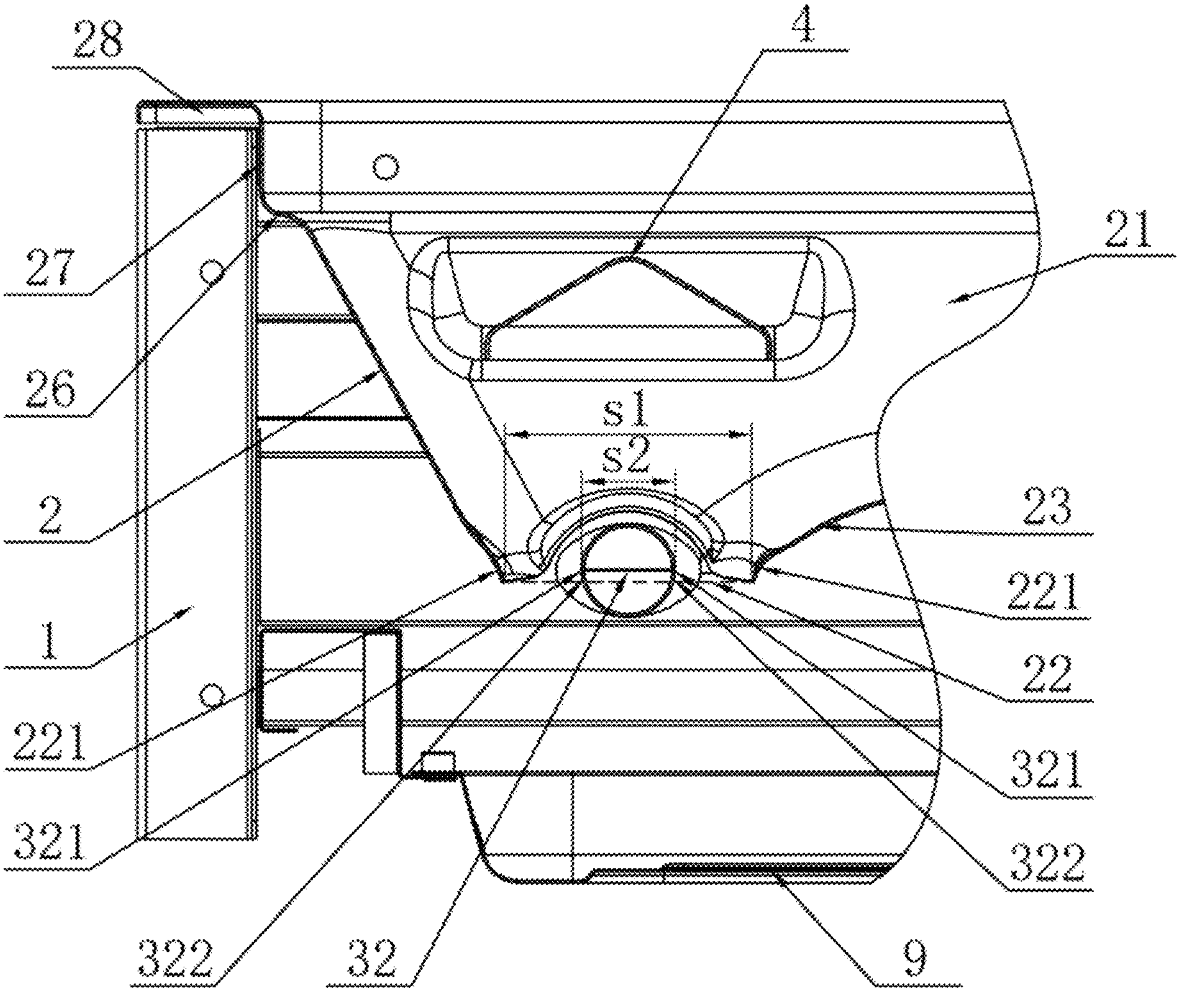
FIG. 6 is an enlarged view of a portion of FIG. 5.

Description of reference numerals: 1. grill rack; 11. front pillar; 12. rear pillar; 13. mounting member; 14. workbench; 15. support rail; 131. snap-in groove; 132. snap-in hole; 141. first snap member; 142. second snap member; 151. limiting portion; 1321. snap-in portion; 1322. insertion portion; 2. grill body; 21. grill cavity; 22. functional opening; 23. flow guide surface; 24. built-in groove; 25. placing groove; 26. first placing table top; 27. annular wall; 28. second placing table top; 221. flame guide portion; 3. gas assembly; 31. control knob; 32. burner; 321. combustion port; 322. combustion zone; 4. guard member; 5. grilling net; 6. upper side plate; 61. mounting portion; 7. grill cover; 81. automatic rotator; 82. barbecue fork; 9. collecting member; 91. handle; 92. collecting groove; 93, peripheral edge; 911. holding segment; 912. first bending segment; 913. extension segment; 914. second bending segment; 915. hinged segment.

DESCRIPTION OF THE EMBODIMENTS

Embodiment I

As shown in FIGS. 1-6, the present invention discloses a grill with an external burner, comprising:

- a grill rack 1, where the grill rack 1 is composed of a plate body, rollers and other structures which are assembled together, and is square in shape as a whole;
- a grill body 2, where the grill body 2 is integrally formed from an enamel material, and the grill body 2 is mounted above the grill rack 1, wherein the grill body 2 is composed of a peripheral wall and a bottom plate so that the grill body 2 is formed with a grill cavity 21 having an opening upward; in addition, four functional openings 22 arranged at intervals in a left-right direction are provided on the bottom plate of the grill cavity 21, and a flow guide surface 23 which is arched upward is provided between adjacent functional openings 22; and
- a gas assembly 3, where the gas assembly 3 is arranged on the grill rack 1, and the gas assembly 3 is composed of a plurality of control knobs 31, four burners 32 and other structures; the four burners 32 are all of a tubular structure, each of the control knobs 31 is located above a front side of the grill rack 1 to form a control panel, and each of the burners 32 is located in the grill rack 1 and arranged at intervals along a left-right direction of the grill rack 1, so that a gas source may be connected to the gas assembly 3, and a gas pipe may be operated by rotating the control knobs 31 to start and stop combustion and regulate combustion size, each of the burners 32 is located at a corresponding functional opening 22, and the gas source is generally a gas tank or the like.

Accordingly, the grill with an external burner according to the present invention can achieve the following beneficial effects:

I. Different burners 32 are controlled by operating the control knobs 31 to start and stop combustion and regulate combustion size, the air at the corresponding functional opening 22 is heated by the combustion of the burners 32, and the air is heated up to enter the grill cavity 21 for heating the grill cavity 21, so that the heated grill cavity 21 can grill food above the grill cavity 21, and the plurality of burners 32 may heat up specific areas individually in case of individual heating and may heat up all spaces within the grill cavity 21 more evenly in case of overall heating.

II. The heating up of the air at each functional opening 22 will reduce air pressure at the corresponding position, so that the air below the corresponding functional opening 22 will enter the functional opening 22 under the action of air pressure and air flow to supplement oxygen at the corresponding burner 32, whereby ensuring sufficient oxygen supply to each burner 32 and enabling complete combustion at each burner 32 to improve the energy conversion efficiency; in addition, the burners 32 are arranged at the functional openings 22, part of heat energy will be transferred downward to below the functional openings 22 due to combustion, but most of the heat energy will enter the grill cavity 21 under the effect of rising heat flow. That is, the heat energy increased by complete combustion is greater than the heat energy diffused from the functional openings 22.

III. The flow guide surface 23 allows the air flow diffusing from the functional openings 22 to be directed upwards, thereby preventing the air flow at each functional opening 22 from flowing towards the adjacent functional openings 22 and preventing the heat carried by the air flow from spreading to the outside of the grill body 2 through the adjacent functional openings 22.

IV. The flow guide surface 23 and the functional openings 22 also have the function of removing refuse, where the refuse comprises food residues, grease and the like, so that the falling refuse is guided towards the functional openings 22 by the flow guide surface 23 and is discharged from the grill cavity 21 through the functional openings 22, and the refuse is discharged through the nearest functional opening 22, which greatly increases the smoothness of discharging the refuse.

V. The grill body 2 is made of an enamel material, and has a better insulation effect compared to the grill body 2 made of metal plates in order to reduce energy loss in the grill cavity 21 caused by the heat diffusion of the grill body 2 itself, thereby improving the efficiency of heat energy utilization. Moreover, the grill body 2 is made of the enamel material and integrally formed, so that the grill body 2 does not have any assembly gap, which eliminates the leakage of liquid refuse (especially grease) caused by the assembly gap, and can eliminate enamel burst of an assembled enamel assembly. In addition, the enamel grill body 2 also has the characteristic of easy cleaning.

VI. The burners 32 are arranged on the bottom, which further facilitates cleaning of the inner peripheral wall of the grill body 2 without interference from the burners 32.

Figure 12:
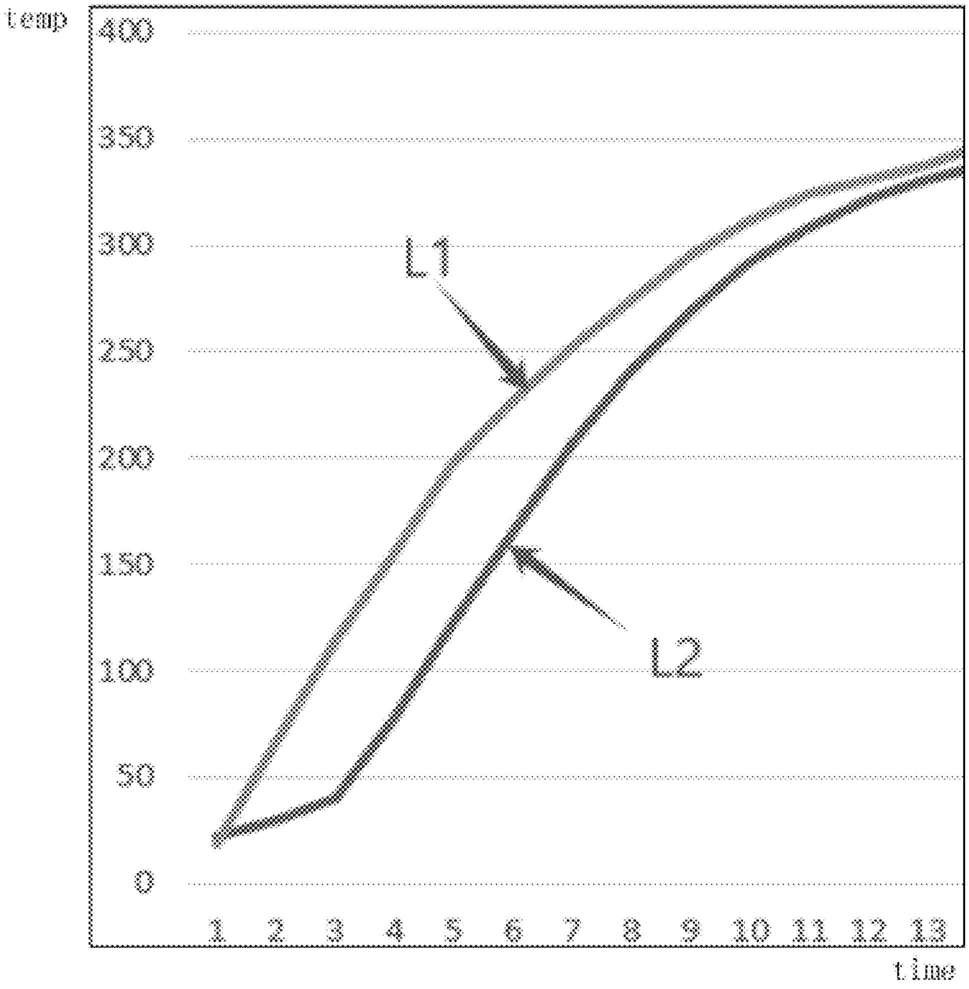
FIG. 12 is a graph of temperature variations in a grill body of a grill with an external burner and a grill with an internal burner.

As shown in FIG. 12, where other factors are the same, the grill with the external burner and a grill with an internal burner were tested, L1 represents temperature change in the grill with the external burner, L2 represents temperature change in the grill with the internal burner, x-axis represents time, and y-axis represents temperature; and L1 took a convex arc-shape during combustion, while L2 took a concave arc shape during combustion, so that L1 showed a more thorough combustion and quicker temperature rise, so that it was faster to approach a limit temperature for use.

Here, a flame guide portion 221 is provided on an inner peripheral wall of the functional opening 22, a combustion zone 322 is provided on the burner 31, the combustion zone 322 is arranged to positionally correspond to the flame guide portion 221, and the combustion zone 322 and the flame guide portion 221 are spaced apart; and the burner 32 burns so that a flame emitted from the combustion zone 322 is guided into the grill cavity 21 through the flame guide portion 221 to heat air in the grill cavity 21 to radiate heat to an opening of the grill cavity 21. Therefore, combustion of the combustion zone 322 is limited by the flame guide portion 221, so that more heat is trapped in the grill cavity 21, less heat escapes to improve energy efficiency, and the combustion zone 322 is spaced apart from the flame guide portion 221 to make room for air replenishment to the combustion zone 322 to ensure complete combustion.

Preferably, the flow guide surface 23 is arranged in the shape of an arc.

Preferably, each of the burners 32 and the functional openings 22 in the present embodiment are arranged in an elongated shape, and a length direction thereof is a front-back direction. Furthermore, each of the burners 32 is provided with a combustion zone 322 on both sides thereof, and each of the combustion zones 322 is provided with several combustion ports 321 along a length direction, and preferably each of the combustion ports 321 is located above the corresponding functional opening 22.

Therefore, the burners 32 arranged in the left and right are provided with the combustion ports 321 arranged in the front-back direction to completely cover the bottom of the grill body 2 to completely heat the grill body 2. In addition, the combustion ports 321 are located above the functional openings 22 to allow the flames to be burned in the grill cavity 21, reducing heat diffusion of the flames to below the functional openings 22 during an initial diffusion process.

More preferably, the combustion ports 321 arranged on the burners 32 in the length direction are arranged in a plurality of groups and are circumferentially arranged to optimize combustion effect.

In other embodiments, the length direction of the burners 32 and the functional openings 22 is a left-right direction, and the functional openings 22 are arranged in the front-back direction.

Correspondingly, a semi-circular built-in groove 24 is provided at front and rear ends of each of the functional openings 22 respectively, an opening is provided below the built-in groove 24, and the burners 32 enter the built-in grooves 24 from bottom to top through the lower openings of the built-in grooves 24, so that the burners 32 are at least partially located in the grill cavity 21, so that the combustion zones 322 of the burners 32 are located above the functional openings 22.

Therefore, for the most common elongated burners 32, by arranging the built-in grooves 24, the front and rear ends of the burners 32 mounted on the grill rack 1 extend out of the grill body 2 through the built-in grooves 24, and are mounted on corresponding structures through the extended structure, and the built-in grooves 24 may ensure that the burners 32 and the grill body 2 do not contact and interfere with each other, preventing the burners and the grill body from being unable to be mounted and being bent due to mutual extrusion. In addition, the lower opening of the built-in groove 24 allows the grill body 2 mounted on the grill rack 1 to be assembled by upward disassembly and downward disassembly without interference with the burners 32 during the disassembly. Therefore, the grill body 2 is more easily disassembled and assembled than the prior art structure in which the burners 32 are mounted in the grill body 2.

Preferably, in the present embodiment, a left-right width of each of the functional openings 22 is s1, and a diameter of each of the burners 32 is s2, with 2s2≤s1≤3s2, which are aimed to minimize heat diffusion from the functional openings 22 provided that the width of the functional openings 22 is adapted to the diameter of the burners 32 to ensure sufficient oxygen supply to the burners 32.

In addition, an elongated guard member 4 is respectively provided above each of the burners 32 in the grill cavity 21 in the present embodiment, a vertical projection of each of the functional openings 22 falls on the corresponding guard member 4, and a width of the guard members 4 is not less than the width of the functional openings 2.

Therefore, for the burners 32, the guard members 4 shield the burners 32 above the burners 32, so that refuse falling above the burners 32 cannot fall directly onto the burners 32, thereby preventing the combustion port 321 from being blocked. In addition, the flames burned by the burners 32 are shielded by the guard member 4 from directly acting on the food, thereby preventing the food from being directly grilled, resulting in uneven heating and affecting mouthfeel. In addition, for the functional openings 22, the guard members 4 shields the functional openings 22 above the functional openings 22, so that refuse falling above the functional openings 22 cannot directly fall into the functional openings 22 and leave the grill body 2 to prevent splashing when the refuse falls too fast to be collected.

Preferably, the guard member 4 in the present embodiment is V-shaped and has a V-shaped opening facing downward, so that the refuse falling on the guard members 4 rolls obliquely downward under the action of the V-shaped guard members 4, falls on the peripheral wall of the grill body 2 or the flow guide surface 23, and finally falls along the peripheral wall or the flow guide surface 23 to the functional openings 22, which not only prevents buildup of the refuse on the guard members 4, but also eliminates a certain kinetic energy as the refuse exiting from the guard member 4 is subject to impact when falling on the peripheral wall of the grill body 2 or the flow guide surface 23, thereby preventing the refuse entering the functional openings 22 from falling too fast to prevent splashing when the refuse falls too fast to be collected.

Preferably, in the present embodiment, placing grooves 25 are respectively provided in the grill cavity 21 at both ends of a length of each of the guard members 4, and the both ends of each of the guard members 4 are respectively placed in the corresponding placing groove 25.

Therefore, the guard members 4 are placed on the grill body 2 in a manner that allows easy assembly and the guard members 4 may be conveniently removed from the grill body 2, so that the guard members 4 can be easily removed when the guard members 4 need to be cleaned and the burners 32, need to be inspected and the guard members can be easily replaced after such operation is completed. In addition, the placing grooves 25 are arranged so that openings will not occur on the surface of the grill body 2, so that there are no holes, gaps and the like on the inner peripheral wall of the integrally formed grill body 2, so that oil leakage and other phenomena can be prevented.

Preferably, the inner peripheral wall of the grill body 2 in the present embodiment is flared upward in the vertical direction, so that the inclined inner peripheral wall can make the upper opening larger, thereby obtaining a larger grilling area with a smaller heating area. Meanwhile, it is further realized that the refuse falling from a periphery above the grill body 2 falls on the inner peripheral wall and is guided by the inner peripheral wall to the functional openings 22 for discharge.

Figure 7:
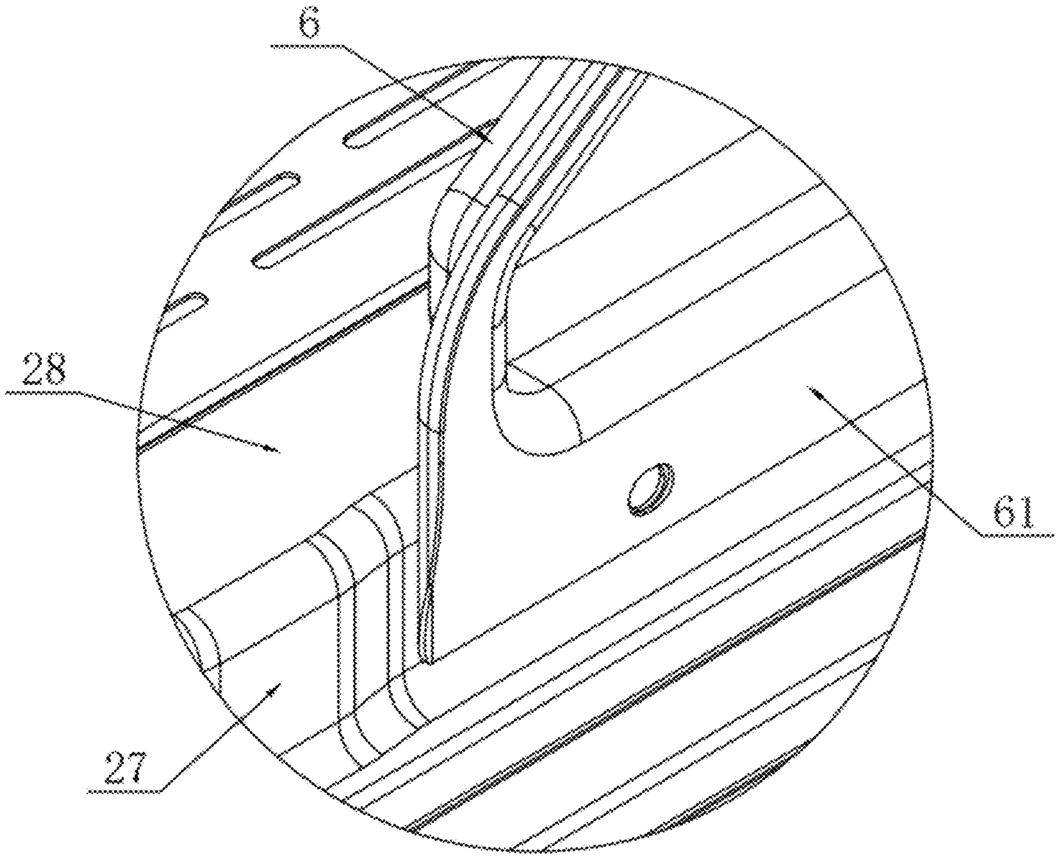
FIG. 7 is an enlarged view of A in FIG. 1.

In addition, as shown in FIG. 7, an outer periphery of an upper end of the grill body 2 in the present embodiment is integrally formed and provided with a first placing table top 26 extending outward, an outer periphery of the first placing table top 26 is integrally formed and provided with an annular wall 27 extending upward, and an outer periphery of an upper end of the annular wall 27 is integrally formed and provided with a second placing table top 28 extending outward, so that a grilling net 5 is placed on the first placing table top 26, and the grilling net 5 is circumferentially limited to an inner periphery of the annular wall 27, the second placing table top 28 is placed on the grill rack 1, and the second placing table top 28 is supported by the grill rack 1; and the annular wall 27 fits the grill rack 1 for vertical limiting.

Therefore, the second placing table top 28 and the annular wall 27 are fitted on the grill rack 1 to mount the grill body 2 on the grill rack 1, and the grilling net 5 is placed on the first placing table top 26 to support the grilling net 5, so that the food can be placed on the grilling net 5 for grilling, and the first placing table top 26 and the grill body 2 below do not need to be provided with a mounting structure, so that there is no need to make holes and there is no gap, so that during grilling, the refuse can only enter the functional openings 22 downwards to leave the grill body 2, preventing the oil leakage.

Specifically, the annular wall 27 in the present embodiment is provided with a plurality of holes in the circumferential direction, and correspondingly the grill rack 1 is provided with holes in the circumferential direction, and is assembled by means of bolts and nuts.

In addition, a U-shaped upper side plate 6 is provided above the second placing table top 28 in the present embodiment, the upper side plate 6 is made of an enamel material, the upper side plate 6 is placed on the second placing table top 28, and the upper side plate 6 is vertically supported by the second placing table top 28, and is located at left, right and rear sides respectively. In addition, the upper side plate 6 is provided with a mounting portion 61 on the inner periphery of the annular wall 27, and the mounting portion 61 fits the annular wall 27 for vertical limiting.

Therefore, the upper side plate 6 is arranged to shield left, right and rear side above the grill body 2, exposing only a front side for operation, so that the heat energy is not easily diffused to temperature at the grilling net 5 to improve the efficiency of heat energy utilization. In addition, the upper side plate 6 is of an enamel structure, which has an effect of facilitating cleaning. Moreover, the upper side plate 6 is vertically supported under the action of the second placing table top 28 and then mounted by fitting with the annular wall 27. Therefore, mounting positions are only the second placing table top 28 and the annular wall 27. Similarly, the first placing table top 26 and the grill body 2 below do not need to be provided with a mounting structure, therefore there is no need to make holes and there is no gap, so that during grilling, the refuse can only enter the functional openings 22 downwards to leave the grill body 2, preventing the oil leakage.

Specifically, the annular wall 27 in the present embodiment is provided with a plurality of holes in the circumferential direction, and correspondingly the upper side plate 6 is provided with holes in the circumferential direction, and is assembled by means of bolts and nuts.

In addition, the upper side plate 6 in the present embodiment is hinged with a grill cover 7, and the grill cover 7 is turned forward to cover an upper side of the grill body 2 for covered grilling on the upper side, and turned backward to open the grill body 2 for open grilling.

In addition, a right side of the upper side plate 6 in the present embodiment is further provided with an automatic rotator 81 and a barbecue fork 82 detachably inserted on the automatic rotator 81, so that the automatic rotator 81 can rotate the barbecue fork 82 to realize automatic rotary grilling.

The upper side plate 6 in the present embodiment is formed by splicing three plates, and in other embodiments, the upper side plate 6 may be of an integrally formed structure.

Specifically, the upper end of the grill rack 1 in the present embodiment is provided with two front pillars 11 on the front side and two rear pillars 12 on a rear side, and four corner ends of the second placing table top 28 are respectively placed on upper ends of the front pillars 11 and the rear pillars 12 for supporting.

Figure 8:
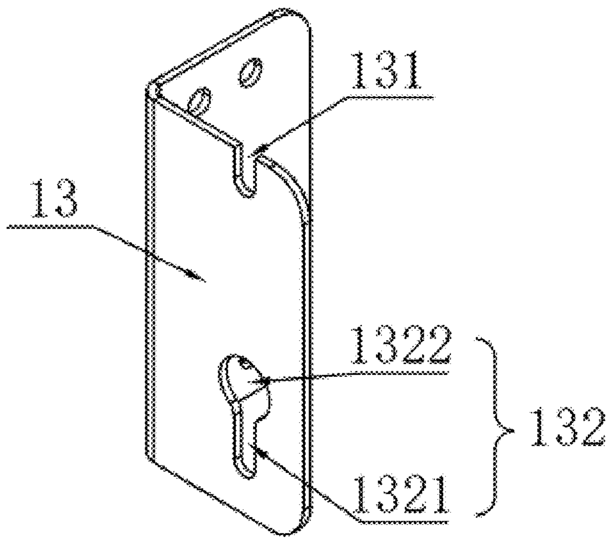
FIG. 8 is a part diagram of a mounting member in Embodiment I of the present invention.
Figure 9:
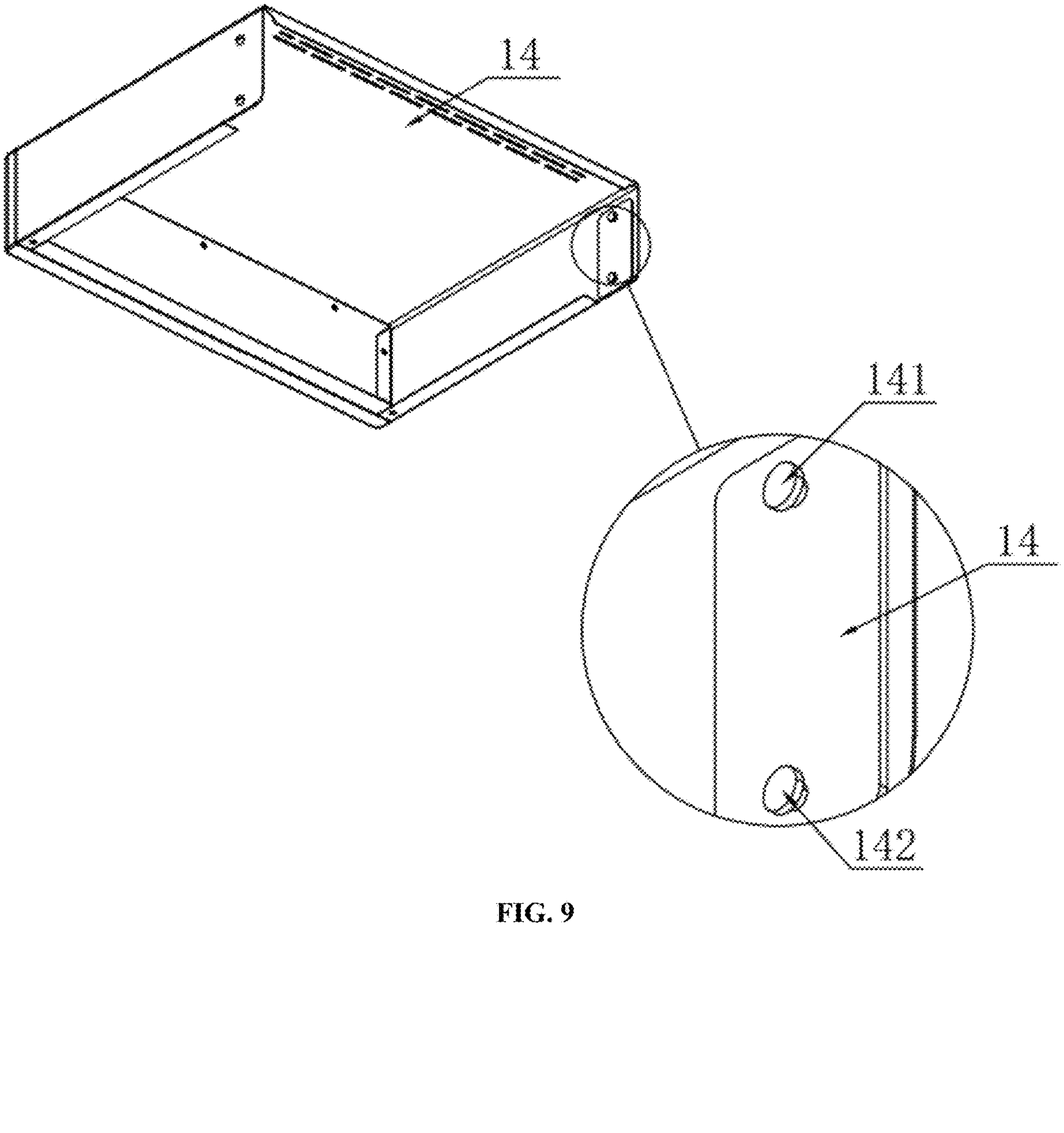
FIG. 9 is a part diagram of a workbench in Embodiment I of the present invention.

As shown in FIGS. 8 and 9, in addition, an L-shaped mounting member 13 is mounted by bolts on each of the front pillars 11 and the rear pillars 12 respectively, a snap-in groove 131 is provided above each of the mounting members 13, and a snap-in hole 132 is provided in the middle of the mounting member 13, and the snap-in hole 132 comprises a lower snap-in portion 1321 and an upper insertion portion 1322. In addition, a workbench 14 is provided on the left and right sides of the grill rack 1, and a first snap member 141 and a second snap member 142 having a step shape are provided on front and rear sides of the workbench 14 respectively corresponding to the snap-in groove 131; and the second snap member 142 is arranged corresponding to the snap-in hole 132, a width of the snap-in groove 131 is adapted to a segment of a small diameter of the first snap member 141, a width of the snap-in portion 1321 is adapted to a segment of a small diameter of the second snap member 142, and a width of the insertion portion 1322 is adapted to a segment of a large diameter of the second snap member 142, so that the second snap member 142 is inserted into the corresponding insertion portion 1322 and moved downwards to allow the second snap member 142 to be inserted into the snap-in portion 1321 while the first snap member 141 is inserted into the snap-in groove 131 to complete assembly, resulting in convenient disassembly and assembly.

Figure 10:
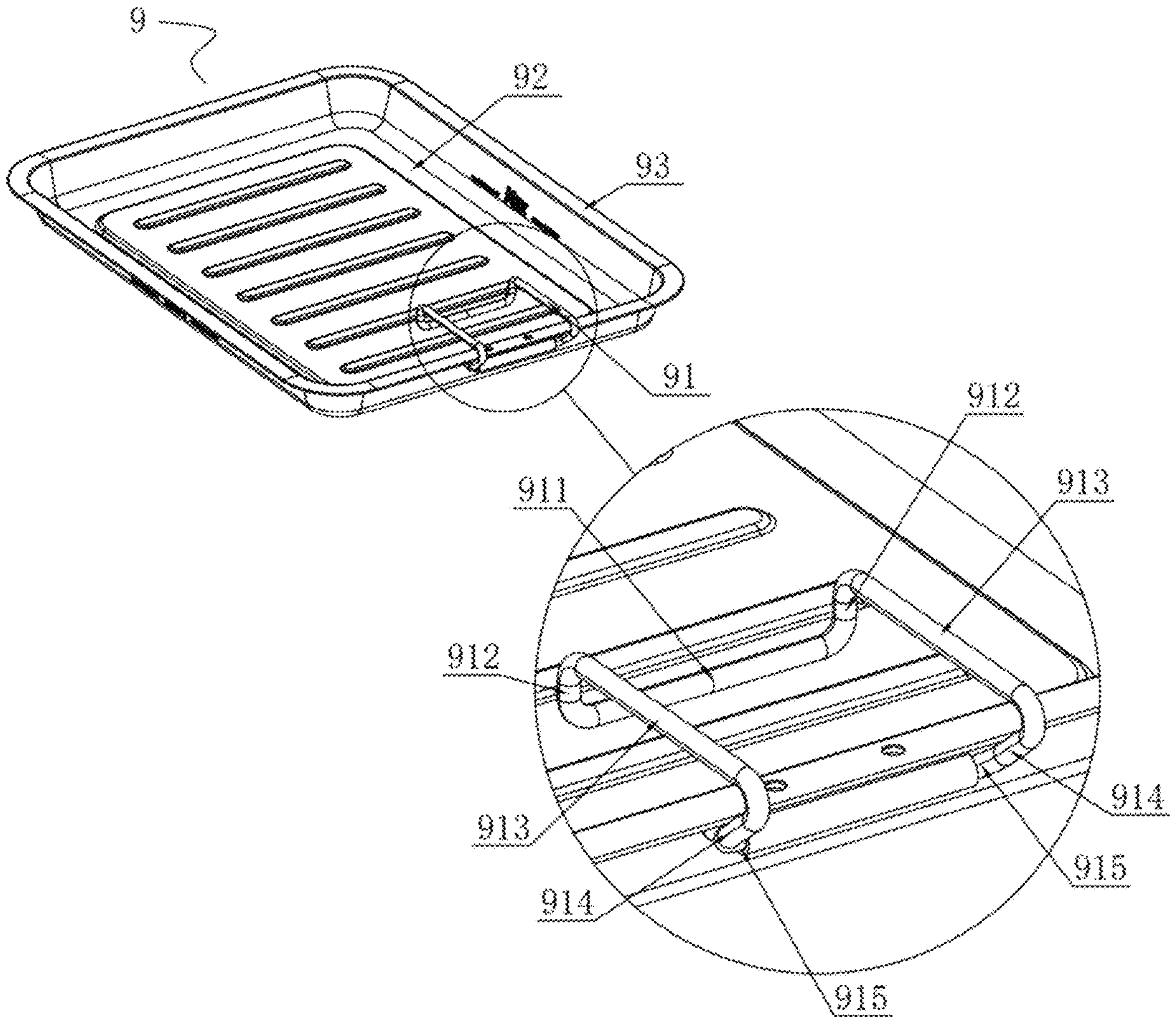
FIG. 10 is a part diagram of a collecting member in Embodiment I of the present invention.
Figure 11:
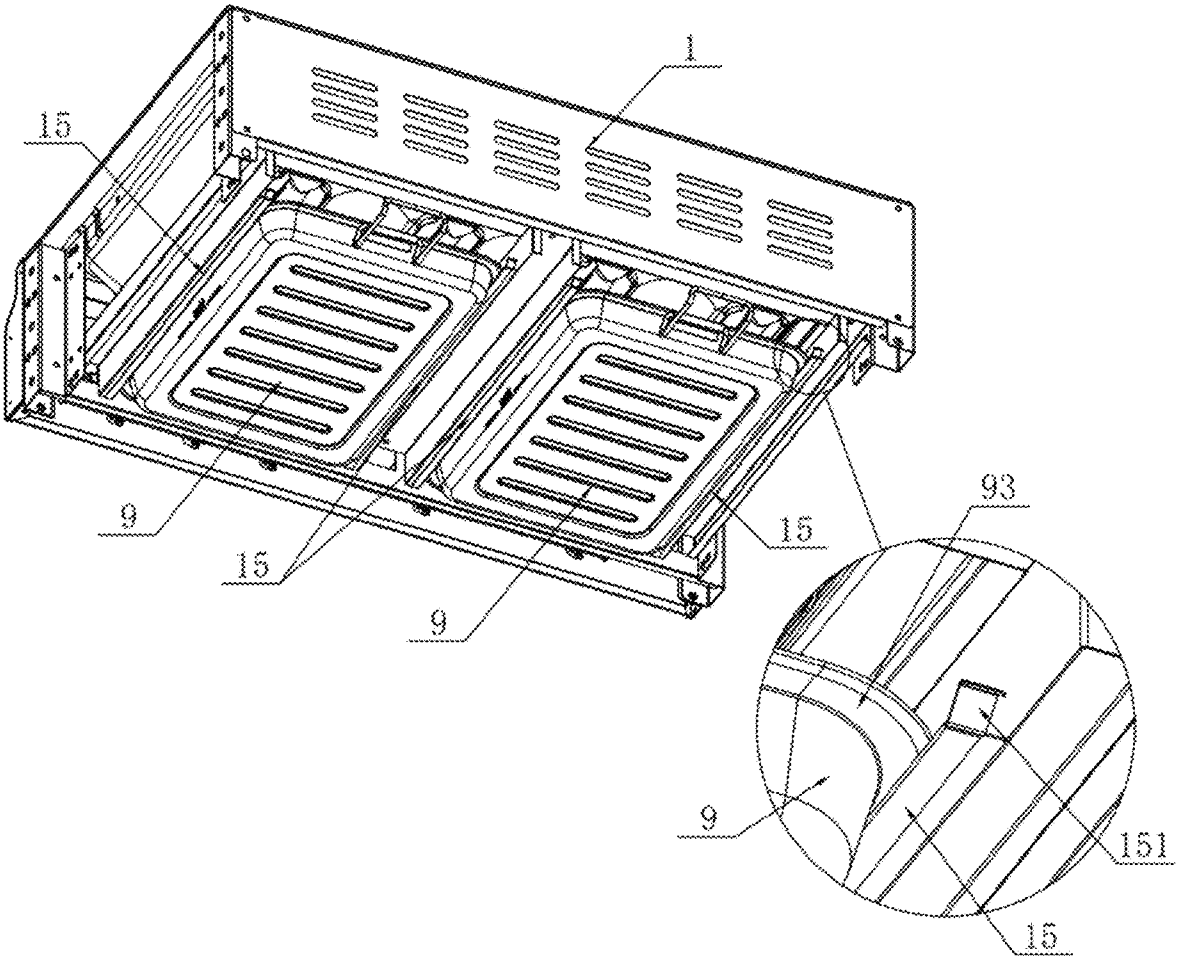
FIG. 11 is an assembly view of part of structures in Embodiment I of the present invention.

As shown in FIGS. 10 and 11, in addition, the grill rack 1 in the present embodiment is provided with two collecting members 9 below the functional openings 22, each of the collecting members 9 is arranged in a left-right arrangement, and correspondingly, each of the collecting members 9 is arranged corresponding to two adjacent functional openings 22. Furthermore, a collecting groove 92 is provided on each of the collecting members 9, and a vertical projection of each of the functional openings 22 falls in the corresponding collecting groove 92. That is, the left collecting member 9 is located directly below the two functional openings 22 on the left, and the right collecting member 9 is located directly below the two functional openings 22 on the right.

Thus, the refuse falling at each functional opening 22 falls into the collecting groove 92 of the corresponding collecting member 9 for collection.

Furthermore, the grill rack 1 is provided with support rails 15 on the left and right sides of each of the collecting members 9, and correspondingly, a peripheral edge 93 is provided on an outer periphery of an upper end of the collecting member 9, so that the collecting member 9 is inserted forward into the grill rack 1 from the rear side, and the collecting member 9 is stably supported below the peripheral edge 93 by the support rails 15. In addition, a handle 91 is provided on the rear side of the collecting member 9, so that the collecting member 9 can be detached from the grill body 1 by manipulating the handle 91.

In addition, a rear side of each of the support rails 15 is provided with a limiting portion 151 projecting upward and having an inverted V-shape to limit backward release of the collecting member 9.

Here, the handle 91 in the present embodiment is formed by bending multiple segments of a rod body. Specifically, the handle 91 comprises a holding segment 911, a first bending segment 912, an extension segment 913, a second bending segment 914 and a hinged segment 915 which are symmetrically located at both ends of the holding segment 911; the holding segment 911 is arranged to extend left and right; the first bending segment 912 and the holding segment 911 are arranged vertically, and the extension segment 913 is synchronously perpendicular to the holding segment 911 and the first bending segment 912; the second bending segment 914 and the holding segment 911 are perpendicular; an included angle between the second bending segment 914 and the extension segment 913 is 30°-60°; and the hinged segment 915 is arranged to extend left and right, so that when the two hinged segments 915 are hinged to an outer wall at the rear side of the collecting member 9, and the second bending segment 914 is turned to abut against the outer wall at the rear side of the collecting member 9, the extension segment 913 extends backwards to make the holding segment 911 rearward to facilitate holding. In addition, when the collecting member 9 is not mounted on the grill rack 1, the extension segment 913 may be turned on the top of the collecting member 9, the extension segment 913 may be made to face downward at front and rear ends, and the first bending segment 912 and the holding segment 911 enter the collecting groove 92 for folding and storage.

In other embodiments, the number of the collecting members 9 is four, and each of the collecting members 9 corresponds to one functional opening 22.

Embodiment II

A grill with an external burner has a main structure the same as Embodiment I, except that the gas assembly 3 is provided on the grill body 2.

Embodiment III

A grill with an external burner has a main structure the same as Embodiment I, except that the burners 32 are arranged in a disc shape and arranged in a matrix, and correspondingly, the functional openings 22 are also circular.

Embodiment IV

A grill with an external burner has a main structure the same as Embodiment I, except that the guard member 4 is either welded or integrally formed on the grill body 2.

Embodiment V

A grill with an external burner has a main structure the same as Embodiment I, except that only one functional opening 22 and one burner 32 are provided.

What is claimed is:

1. A grill with an external burner, comprising:

a grill rack;

a grill body, the grill body being integrally formed, the grill body being arranged on the grill rack, a grill cavity having an opening upward being provided in the grill body, a functional opening and a flow guide surface provided adjacent to the functional opening and arched upward being provided on a bottom of the grill cavity; and a burner provided at the functional opening; and wherein a flame guide portion is provided on an inner peripheral wall of the functional opening, a combustion zone positionally corresponding to the flame guide portion is provided on the burner, the combustion zone and the flame guide portion are spaced apart, and the burner burns so that a flame emitted from the combustion zone is guided into the grill cavity through the flame guide portion to heat air in the grill cavity to radiate heat to an opening above the grill cavity.

2. The grill with an external burner according to claim 1, wherein the number of the functional openings is multiple, and the functional openings are arranged at intervals; the number of the burners is the same as the number of the functional openings; each of the burners and each of the functional openings are arranged in an elongated shape; each of the burners is provided with several combustion ports along a length direction, and each of the combustion ports is located above a corresponding functional opening.

3. The grill with an external burner according to claim 2, wherein each of the burners is arranged on the grill rack, each of the functional openings is provided with a built-in slot at both ends of a length of the corresponding burner, an opening of each of the built-in slots faces downward, and the burners enter the grill cavity from bottom to top through lower end openings of the built-in slots, so that the burners are at least partially located in the grill cavity, so that the combustion zones of the burners are located above the functional openings.

4. The grill with an external burner according to claim 2, wherein an elongated guard member is respectively provided in the grill cavity above each of the burners, and a width of the guard member is not less than a width of the functional opening.

5. The grill with an external burner according to claim 4, wherein placing grooves are respectively provided in the grill cavity at both ends of a length of each of the guard members, and the both ends of each of the guard members are respectively placed in the corresponding placing groove.

6. The grill with an external burner according to claim 4, wherein an inner peripheral wall of the grill body is flared upward in a vertical direction.

7. The grill with an external burner according to claim 2, wherein the grill rack is provided with several collecting members below the functional openings, each of the collecting members is arranged along a length direction of the grill rack, and each of the collecting members is arranged in correspondence with one or more adjacent functional openings to collect refuse falling from the corresponding functional openings.

8. The grill with an external burner according to claim 1, wherein an outer periphery of an upper end of the grill body is integrally formed and provided with a first placing table top extending outward, an outer periphery of the first placing table top is integrally formed and provided with an annular wall extending upward, and an outer periphery of an upper end of the annular wall is integrally formed and provided with a second placing table top extending outward;

a grilling net is placed on the first placing table top, and the grilling net is circumferentially limited to an inner periphery of the annular wall;

the second placing table top is placed on the grill rack;

the annular wall fits the grill rack for vertical limiting;

a U-shaped upper side plate is provided above the second placing table top, and the upper side plate is placed on the second placing table top; and the upper side plate is provided with a mounting portion on the inner periphery of the annular wall, and the mounting portion fits the annular wall for vertical limiting.

9. The grill with an external burner according to claim 8, wherein a grill cover is hinged to the upper side plate.

10. The grill with an external burner according to claim 1, wherein the grill body is made of an enamel material.

* * * * *